(12) United States Patent
Eisele et al.

(10) Patent No.: US 11,577,703 B2
(45) Date of Patent: Feb. 14, 2023

(54) METHOD FOR ESTIMATING THE LOCKING PRESSURE IN THE BRAKE SYSTEM OF A MULTI-AXLE VEHICLE

(71) Applicant: Robert Bosch GmbH, Stuttgart (DE)

(72) Inventors: Achim Eisele, Hessigheim (DE); Andreas Klug, Untergruppenbach (DE); Andreas Zoebele, Markgroeningen (DE); Jan Becker, Backnang (DE); Matthias Kranich, Grossbottwar (DE); Philipp Weingart, Heilbronn (DE)

(73) Assignee: Robert Bosch GmbH, Stuttgart (DE)

( * ) Notice: Subject to any disclaimer, the term of this patent is extended or adjusted under 35 U.S.C. 154(b) by 459 days.

(21) Appl. No.: 16/887,359

(22) Filed: May 29, 2020

(65) Prior Publication Data

US 2021/0061243 A1 Mar. 4, 2021

(30) Foreign Application Priority Data

Aug. 26, 2019 (DE) .......................... 102019212748.7

(51) Int. Cl.
*B60T 8/172* (2006.01)
*B60T 17/22* (2006.01)
*B60T 8/17* (2006.01)
*B60T 8/171* (2006.01)
*G01B 21/16* (2006.01)

(52) U.S. Cl.
CPC ................ *B60T 8/172* (2013.01); *B60T 8/17* (2013.01); *B60T 8/171* (2013.01); *B60T 17/221* (2013.01); *G01B 21/16* (2013.01); *B60T 2240/06* (2013.01); *B60T 2250/00* (2013.01)

(58) Field of Classification Search
CPC .... B60T 8/172; B60T 17/221; B60T 2250/00; B60T 8/171; B60T 8/17; B60T 2240/06; G01B 21/16
See application file for complete search history.

(56) References Cited

U.S. PATENT DOCUMENTS

| | | | | |
|---|---|---|---|---|
| 4,900,099 | A * | 2/1990 | Braschel | B60T 8/17616 303/174 |
| 5,251,970 | A * | 10/1993 | Braschel | B60T 8/17616 303/185 |
| 6,450,586 | B1 * | 9/2002 | Nagano | B60T 8/4275 303/2 |
| 9,227,606 | B2 * | 1/2016 | Strehle | B60T 8/17616 |
| 2007/0029875 | A1 * | 2/2007 | Kurosaki | B60T 8/1764 303/DIG. 1 |

OTHER PUBLICATIONS

WO Document No. 01/56848 to Gronau et al dated Aug. 7, 2001.*
German Patent No. DE 10116755 to Luh et al dated Sep. 19, 2002.*

* cited by examiner

*Primary Examiner* — Pamela Rodriguez
(74) *Attorney, Agent, or Firm* — Norton Rose Fulbright US LLP; Gerard Messina

(57) ABSTRACT

In a method for estimating the locking pressure in the brake system of a multi-axle vehicle during a dynamic axle-load transfer, the locking pressure is ascertained during the axle-load transfer and the wheel normal force is ascertained at two points in time during the axle-load transfer and the locking pressure is ascertained therefrom at the later point in time.

12 Claims, 2 Drawing Sheets

METHOD FOR ESTIMATING THE LOCKING PRESSURE IN THE BRAKE SYSTEM OF A MULTI-AXLE VEHICLE

CROSS REFERENCE

The present application claims the benefit under 35 U.S.C. § 119 of German Patent Application No. DE 102019212748.7 filed on Aug. 26, 2019, which is expressly incorporated herein by reference in its entirety.

FIELD

The present invention relates to a method for estimating the locking pressure in the brake system of a multi-axle vehicle in the event of a dynamic axle-load transfer.

BACKGROUND INFORMATION

Some conventional Hydraulic brake systems in vehicles are equipped with an anti-lock system (ABS), with the aid of which a braked wheel is to be prevented from locking. When locking, the braked wheel enters too far into the range of sliding friction so that it is no longer possible to ensure the steerablity of the vehicle, if the locking wheel is used for steering the vehicle, because in this case it not possible to transfer lateral guidance forces from the wheel onto the ground. In order to prevent this state, anti-lock systems are designed so that the brake pressure may only be increased up to a lock-up tendency of the wheel, at which the slip of the wheel reaches a given limit value. The slip of the wheel is ascertained from a comparison of the wheel speed, which is determined with the aid of a wheel speed sensor, with a reference speed of the vehicle. Following the detection of the lock-up tendency, the brake pressure in the brake system is lowered so that in the case of a steerable wheel the steerability of the vehicle remains ensured.

The level of the transferable brake force depends on the current coefficient of friction between the wheel and the ground, which is defined as a quotient of brake force and normal force. In the event of a dynamic axle-load transfer, which occurs for example in a braking action involving a high brake force, the normal force on the vehicle wheel changes and thus also the coefficient of friction. Since the longitudinal slip also changes over the μ slip curve, the brake pressure level must also be adapted in order securely to prevent the wheel from locking.

SUMMARY

With the aid of an example method of the present invention, it is possible to estimate the locking pressure in a wheel brake device in the hydraulic brake system of a multi-axle vehicle in the event of a dynamic axle-load transfer. This makes it possible to adapt the brake pressure level in the wheel brake device of a vehicle wheel so as to prevent the wheel of the vehicle from locking in the event of an axle-load transfer. In the case of a steerable wheel, steerability is preserved.

In order to prevent locking securely, it is necessary to know the current locking pressure in the wheel brake device of the respective vehicle wheel. The locking pressure depends on the current normal force on the vehicle wheel, which changes in the event of a dynamic axle-load transfer. In order to estimate the locking pressure during the axle-load transfer, first the locking pressure is determined at a first point in time, preferably when reaching the maximum of the coefficient of friction, in particular at the beginning of the ABS (anti-lock system) pressure reduction when a lock-up tendency is imminent, in a brake pressure control cycle. It is possible to detect an imminent lock-up tendency on the basis of the μ-slip curve when the longitudinal slip on the vehicle wheel exceeds a limit value. The longitudinal slip may be determined from the wheel speed, which may be detected via a wheel speed sensor, and a reference speed of the vehicle, the longitudinal slip being defined as a quotient of wheel speed and reference speed.

With the knowledge of the locking pressure at a given axle-load distribution at a first point in time, it is possible to estimate the locking pressure at a subsequent, second point in time within the ongoing brake pressure control, in particular an ABS control, during a subsequent brake pressure control cycle during the ongoing dynamic axle-load transfer.

An ABS control cycle is to be understood as the pressure modulation between two pressure reduction phases, which are initiated when reaching the adhesion limit (maximum of the coefficient of friction).

The example method is used to determine the locking pressure, which was ascertained at the first point in time—during the first brake pressure control cycle—, as well as the ratio of the wheel normal force at a second point in time during a subsequent brake pressure control cycle to the wheel normal force at the first point in time. From these variables, it is possible to estimate the locking pressure during the axle-load transfer at the second point in time. This estimate may be performed without a brake pressure control process having to occur at a brake pressure in the range of wheel instability at the second point in time during the axle-load transfer.

The method is carried out during an ongoing braking process, in particular a brake pressure control, preferably an ABS control. The first point in time lies within a first brake pressure control cycle within the brake pressure control, while the second point in time lies within a subsequent, second brake pressure control cycle within the same brake pressure control. Advantageously, a plurality of successive brake pressure control cycles are performed during the brake pressure control. If required, there could be further brake pressure control cycles between the first and the second brake pressure cycles. In the first brake pressure control cycle, the locking pressure is preferably determined when the maximum coefficient of friction is reached. The brake pressure control is a brake pressure control process.

This manner of proceeding has the advantage of making it possible, during the dynamic axle-load transfer, to estimate the locking pressure at the second point in time and to adapt the pressure level in the wheel brake device accordingly. It is in particular possible optimally to make use of the current coefficient of friction so as to achieve a high braking effect without risk of locking the vehicle wheel. When the locking pressure is known, it is possible to increase the brake pressure quickly in the wheel brake device without danger of an imminent wheel instability.

This manner of proceeding is possible both in the case of falling wheel normal forces as well as in the case of rising wheel normal forces. In the case of falling wheel normal forces, it is possible to slow down the brake force buildup due to the fact that the wheel instability is to be expected earlier, whereby pressure jumps and high pressure gradients are avoided or at least reduced. Conversely, in the case of rising wheel normal forces, the brake pressure buildup may be accelerated due to the fact that the wheel instability is to be expected later, the accordingly higher pressure buildup gradient also not resulting in a wheel instability due to the higher normal force.

The variables required for determining the locking pressure during the axle-load transfer may be detected sensorially. It is possible for example to ascertain the wheel normal force on the vehicle wheel with the aid of a ride-height sensor, which measures body movements between the vehicle axle, on which the vehicle wheel is situated, and the road surface. The change in the normal force may be inferred from the height change, which is measured by the ride-height sensor. It is also possible to ascertain an absolute normal force level. Using the ride-height sensor, it is also possible to detect the axle-load transfer that occurs in a braking action or in a steering movement.

It may be expedient to assume an axle-load transfer only when the wheel normal force change or the movement of the body exceeds a threshold value.

According to a preferred development of the present invention, the locking pressure is calculated at a desired, second point in time during the axle-load transfer from the multiplication of the locking pressure from the previous ABS control cycle (first point in time) with the ratio of the wheel normal forces—current normal force at the second point in time to the normal force at the first point in time during the last ABS reduction in the previous ABS control cycle. Accordingly, the locking pressure during the axle-load transfer is ascertained by extrapolating from the locking pressure of the last ABS control cycle with the aid of the wheel normal force ratio. Since the wheel normal force may be determined at any point in time, for example from the body movement via the ride-height sensor, it is possible to ascertain the locking pressure at any point in time. The prerequisite is merely that the locking pressure was determined at a specific, first point in time and that at this point in time the wheel normal force is available as well. If these variables are given, then it is also possible to determine at any later point in time the current locking pressure via the current wheel normal force. The ratio of the current wheel normal force to the wheel normal force at the first point in time, at which the locking pressure was determined, indicates the axle-load transfer.

According to another advantageous variant of the present invention, the locking pressure gradient is also taken into account when setting the current brake pressure. The locking pressure gradient may be calculated from the gradient of the wheel normal force when the locking pressure at an earlier, first point in time and the wheel normal force at this earlier point in time are known. If the locking pressure gradient is known, then it is possible to set the dynamics of the pressure build-up in optimized fashion.

The example method according to the present invention is advantageously carried out during a current brake pressure control process, in particular of an anti-lock system or ESP system (electronic stability program) that intervenes in controlling fashion. The locking pressure during the axle-load transfer is determined while the brake pressure control process is running. This presupposes that the road conditions and thus also the coefficient of friction do not change or at least do not change considerably within the time of the current brake pressure control process between the first and the second point in time.

Another aspect of the present invention relates to a method for improving a braking process. In an example method according to the present invention, first, as described above, the locking pressure during a dynamic axle-load transfer is estimated, the estimated locking pressure being supplied as input variable to the brake pressure control system, in particular to the anti-lock braking system or ESP system. This makes it possible to implement a maximum deceleration of the vehicle without the risk of vehicle instabilities.

Another aspect of the present invention relates to a control unit for controlling the adjustable components of a hydraulic brake system, the method steps described above being carried out in the control unit.

The present invention furthermore relates to a hydraulic brake system in a vehicle, which is equipped with a corresponding control unit for implementing the method.

The present invention moreover relates to a vehicle having a hydraulic brake system as described above. The vehicle has at least two vehicle axles, between which a dynamic axle-load distribution (transfer) can occur. The vehicle is preferably designed as a multi-track vehicle, in particular as a motor vehicle or a commercial vehicle. An application to single-track vehicles such as motorcycles or motor scooters, however, may also be considered.

The present invention also relates to a computer program product having program code, which is designed to carry out the method steps described above. The computer program product runs on a control unit as described above.

Additional advantages and expedient developments are described herein and are shown in the figures.

DETAILED DESCRIPTION OF EXAMPLE EMBODIMENTS

Figure 1:
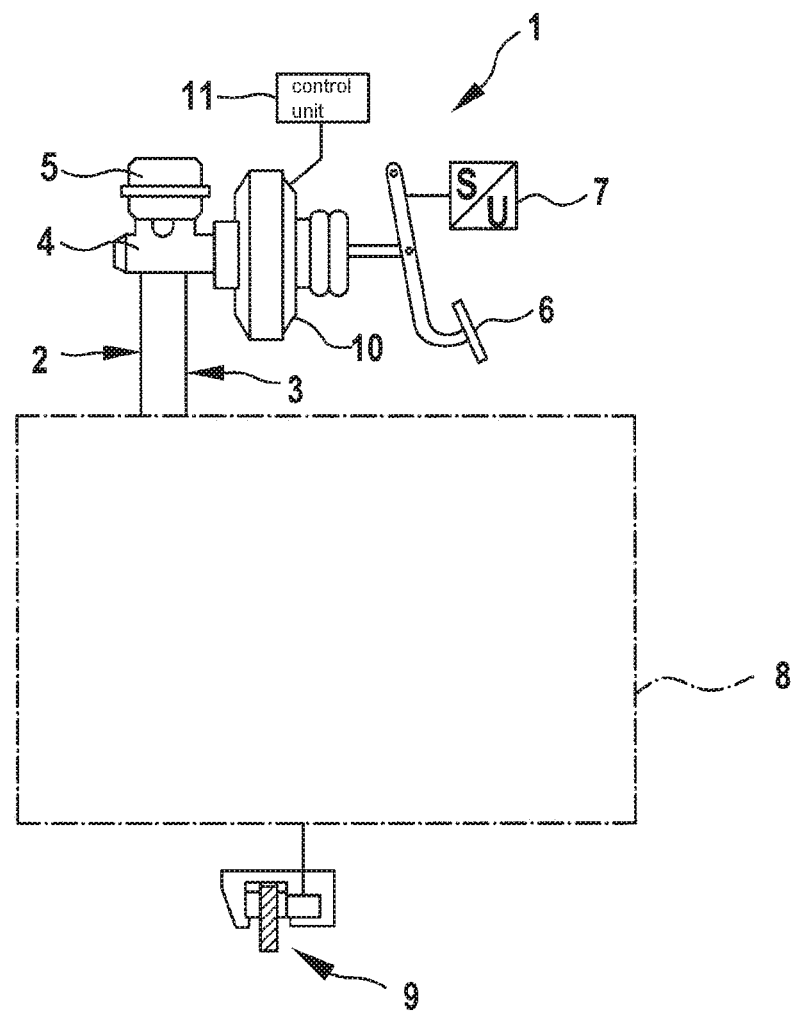
FIG. 1 shows a schematic representation of an hydraulic brake system in a vehicle.

The hydraulic brake system 1 for a vehicle shown in FIG. 1 comprises two brake circuits 2, 3, for example a front-axle brake circuit 2 and a rear-axle brake circuit 3 for supplying and controlling wheel brake devices 9 on each wheel of the vehicle with an hydraulically pressurized brake fluid. The two brake circuits 2, 3 are connected to a common master brake cylinder 4, which is supplied with brake fluid via a brake fluid reservoir 5. Master brake cylinder 4 is operated by the driver via brake pedal 6, the pedal travel implemented by the driver being measured via a pedal travel sensor 7. Located between brake pedal 6 and master brake cylinder 4 is a power brake unit 10, which comprises for example an electric motor, which operates master brake cylinder 4 via a gear unit (iBooster). The actuating movement of brake pedal 6 measured by pedal travel sensor 7 is transmitted as a sensor signal to a control unit 11, in which actuating signals are produced for controlling power brake unit 10. Wheel brake devices 9 are supplied with brake fluid in each brake circuit 2, 3 via different control valves, which together with additional aggregates are part of a brake hydraulic system 8. Brake hydraulic system 8 furthermore comprises a hydraulic pump, which is a component of an anti-lock system (ABS) or an electronic stability program (ESP).

An example method according to the present invention is described below for estimating the locking pressure in the brake system of a multi-axle vehicle during a dynamic axle-load transfer. The locking pressure represents the brake pressure in the hydraulic brake system at which the vehicle wheel is locked. In particular, in the case of a steerable vehicle wheel, the latter becomes unstable when locked and is no longer steerable.

Figure 2:
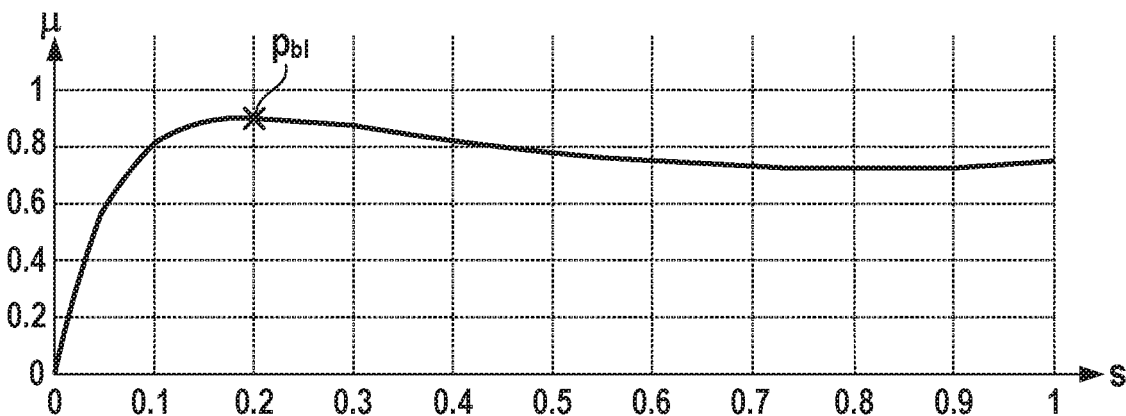
FIG. 2 shows a μ-slip curve showing the characteristic of the coefficient of friction as a function of the longitudinal slip.

In the μ-slip graph shown in FIG. 2, the maximum of the curve at a longitudinal slip s of approximately 0.2 represents the critical point at which an increasing slip s begins to threaten to lock the vehicle wheel and render it unstable. In the event of a dynamic axle-load transfer, the normal force $F_N$ acting on the wheel changes. Thus, at a uniform coefficient of friction μ, the brake force transferable via the vehicle wheel in the longitudinal direction of the wheel changes as well.

The maximum of the μ-slip curve is assigned a locking pressure $p_{bl}$, which must not be exceeded in the wheel brake device of the vehicle wheel in order to avoid an instability of the wheel. The locking pressure $p_{bl}$ may be ascertained during a braking process with active brake pressure control, in particular when the anti-lock system ABS is active, in which the hydraulic brake pressure moves to the maximum of the μ-slip curve, but not beyond it. It is thus possible to determine the locking pressure $p_{bl}$ when the anti-lock system ABS intervenes in the brake system of the vehicle in controlling fashion.

The locking pressure $p_{bl}$ depends on the wheel normal force $F_N$. The latter may likewise be detected at the time of determining the locking pressure, for example with the aid of a ride-height sensor, which measures body movements between the vehicle axle, on which the vehicle wheel suspended, and the road surface. With this information it is possible to infer a changed locking pressure, which results during the ongoing brake pressure control following a dynamic axle-load transfer. In the event of an intense braking action or when cornering, the axle-load distribution changes between the front axle and the rear axle of a vehicle and thus also the wheel normal force on a vehicle wheel of the front axle or the rear axle. This results in a change of the locking pressure on the vehicle wheel.

The changed locking pressure $p_{bl,T2}$ at a point in time T2 may be ascertained, when locking pressure $p_{bl,T1}$ at a point in time T1 is known, from the following relationship:

$$p_{bl,T2} = \frac{F_{N,T2}}{F_{N,T1}} \cdot p_{bl,T1}$$

The wheel normal force $F_{N,T1}$ at time T1, at which locking pressure $p_{bl,T1}$ was ascertained as well, is known. At time T2, it is also possible to ascertain the wheel normal force $F_{N,T2}$ from the sensor information, in particular of a ride-height sensor. Thus all the information required for calculating the locking pressure $p_{bl,T2}$ at time T2 is available. Locking pressure $p_{bl,T2}$ corresponds to the locking pressure during the axle-load transfer at time T2 and may be utilized for the further control of the brake pressure control system. The knowledge of the locking pressure at time T2 improves the coefficient of friction utilization and allows for a rapid braking force buildup.

Time T2 may in principle be at an arbitrary time interval from time T1, at which locking pressure $p_{bl,T1}$ and wheel normal force $F_{N,T1}$ were determined, provided that the roadway friction coefficient does not change significantly during this time. This makes it possible to take any axle-load transfer into account and to determine an adapted locking pressure. It is merely necessary to determine the wheel normal force $F_N$ at time T2, which may be done readily however with the aid of the ride-height sensor. It is expedient, however, to determine the new locking pressure (time T2) for every new ABS control cycle at the beginning of the pressure build-up.

Additionally, it is also possible to take the locking pressure gradient into account in accordance with $$\frac{dp_{bl}(t)}{dt} = \frac{p_{bl,T1}}{F_{N,T1}} \cdot \frac{dF_N(t)}{dt}.$$

At a time t=T2, the locking pressure gradient may be ascertained from the locking pressure and the wheel normal force at time T1 and from the gradient of the wheel normal force at time T2.

Figure 3:
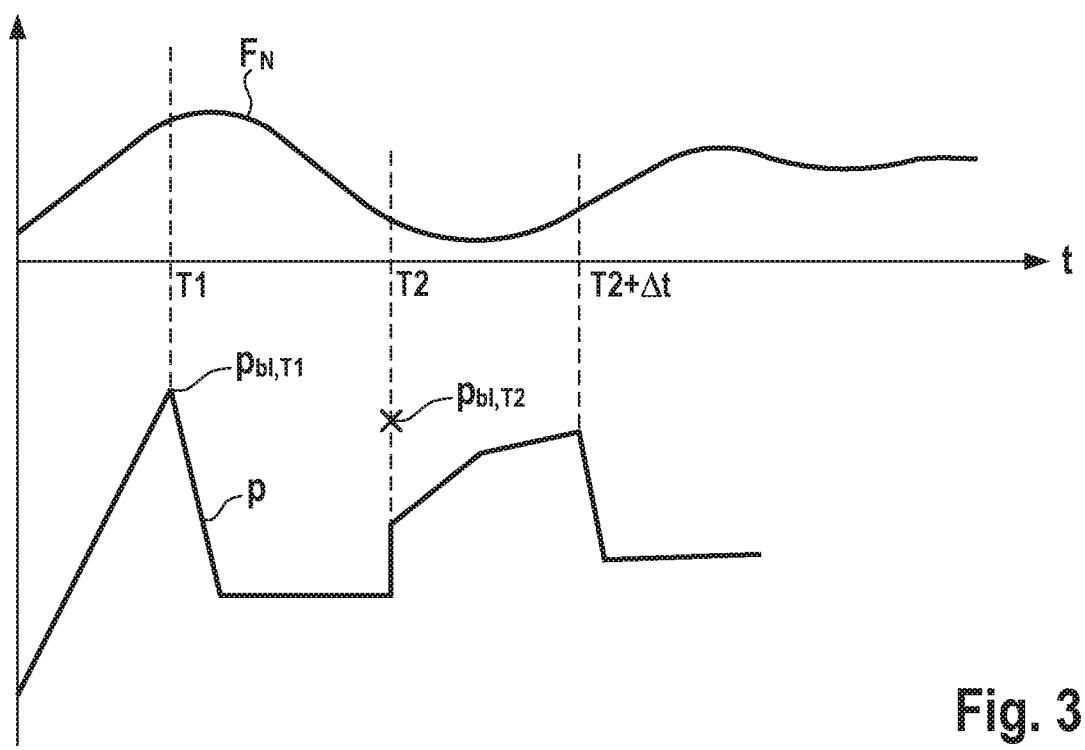
FIG. 3 shows a graph showing the time characteristic of the wheel normal force on a vehicle wheel with a dynamic axle-load transfer and the characteristic curve of the brake pressure.

In the graph shown in FIG. 3, the upper curve shows in exemplary fashion the normal force characteristic $F_N$ at a varying axle load. At an arbitrarily selected time T1, the normal force characteristic is about to reach a maximum. If the anti-lock system is active in the brake system at this time T1, then it is possible to determine the associated locking pressure $p_{bl,T1}$. The associated normal force $F_{N,T1}$ may be determined with the aid of a ride-height sensor in the vehicle axle. The associated pressure characteristic of brake pressure p including locking pressure $p_{bl,T1}$ is seen in the lower curve in the graph of FIG. 3.

Starting from the locking pressure $p_{bl,T1}$ and the normal force $F_{N,T1}$ at time T1, it is possible to determine the locking pressure $p_{bl,T2}$ at time T2 or at any time, for example at a time T2+Δt. It is merely necessary to ascertain at time T2 or T2+Δt the wheel normal force, whereupon the current locking pressure $p_{bl,T2}$ may be determined from the relationship indicated above.

What is claimed is:

1. A method for estimating a locking pressure in a brake system of a multi-axle vehicle in a dynamic axle-load transfer, the method comprising the following steps:
 determining, during a braking process, the locking pressure in a wheel brake device of a vehicle wheel at the vehicle wheel, at a first point in time during the axle-load transfer;
 determining, at the first point in time, a wheel normal force at the vehicle wheel; and
 ascertaining, at a second point in time subsequent to the first point in time, the locking pressure in the braking process, from the locking pressure determined at the first point in time, and from a relationship of a wheel normal force at the second point in time to the wheel normal force at the first point in time.

2. The method as recited in claim 1, wherein the locking pressure during the dynamic axle-load transfer at the first point in time is ascertained during a brake pressure control process in the brake system.

3. The method as recited in claim 1, wherein the locking pressure at the second point in time (T2) during the axle-load transfer is ascertained from the relationship $$p_{bl,T2} = \frac{F_{N,T2}}{F_{N,T1}} \cdot p_{bl,T1}$$

wherein:
 T1 indicates a first point in time during the axle-load transfer;

T2 indicates a second point in time during the axle-load transfer;
$p_{b1,T1}$ indicates the locking pressure at time T1;
$p_{b1,T2}$ indicates the locking pressure at time T2;
$F_{N,T1}$ indicates the wheel normal force at time T1; and
$F_{N,T2}$ indicates the wheel normal force at time T2.

4. The method as recited in claim 3, wherein in an adjustment of the brake pressure, a gradient of the locking pressure is taken into account in accordance with the following:

$$\frac{dp_{bl}(t)}{dt} = \frac{p_{bl,T1}}{F_{N,T1}} \cdot \frac{dF_N(t)}{dt}.$$

wherein $$\frac{dp_{bl}(t)}{dt}$$

is the gradient of the locking pressure at time t, and $$\frac{dF_N(t)}{dt}$$

is a gradient of the wheel normal force at the time t.

5. The method as recited in claim 1, wherein the wheel normal forces are ascertained using a ride-height sensor, which measures body movements between a vehicle axle and a road surface.

6. The method as recited in claim 1, wherein the axle-load transfer is ascertained by a ride-height sensor from a body movement or from the wheel normal forces.

7. The method as recited in claim 1, wherein the method is performed during an ongoing brake pressure control process.

8. A method for improving a braking process, comprising the following steps:
estimating a locking pressure in a brake system of a multi-axle vehicle in a dynamic axle-load transfer, by:
determining, during the braking process, the locking pressure in a wheel brake device of a vehicle wheel at the vehicle wheel, at a first point in time during the axle-load transfer,
determining, at the first point in time, a wheel normal force at the vehicle wheel, and
ascertaining, at a second point in time subsequent to the first point in time, the locking pressure in the braking process, from the locking pressure determined at the first point in time, and from a relationship of a wheel normal force at the second point in time to the wheel normal force at the first point in time, and
providing the locking pressure ascertained at the second point in time as a locking pressure prediction to a brake pressure control system as an input variable.

9. A control unit for controlling adjustable components of a hydraulic brake system in a vehicle, the control unit configured to:
estimate a locking pressure in the brake system of a multi-axle vehicle in a dynamic axle-load transfer, by:
determining, during a braking process, the locking pressure in a wheel brake device of a vehicle wheel at the vehicle wheel, at a first point in time during the axle-load transfer,
determining, at the first point in time, a wheel normal force at the vehicle wheel, and
ascertaining, at a second point in time subsequent to the first point in time, the locking pressure in the braking process, from the locking pressure determined at the first point in time, and from a relationship of a wheel normal force at the second point in time to the wheel normal force at the first point in time, and
provide the locking pressure ascertained at the second point in time as a locking pressure prediction to a brake pressure control system as an input variable.

10. An hydraulic brake system in a vehicle, comprising:
a control unit for controlling adjustable components of the hydraulic brake system in a vehicle, the control unit configured to:
estimate a locking pressure in a brake system of a multi-axle vehicle in a dynamic axle-load transfer, by:
determining, during a braking process, the locking pressure in a wheel brake device of a vehicle wheel at the vehicle wheel, at a first point in time during the axle-load transfer,
determining, at the first point in time, a wheel normal force at the vehicle wheel, and
ascertaining, at a second point in time subsequent to the first point in time, the locking pressure in the braking process, from the locking pressure determined at the first point in time, and from a relationship of a wheel normal force at the second point in time to the wheel normal force at the first point in time, and
provide the locking pressure ascertained at the second point in time as a locking pressure prediction to a brake pressure control system as an input variable.

11. A vehicle, comprising a hydraulic brake system including a control unit for controlling adjustable components of the hydraulic brake system in the vehicle, the control unit configured to:
estimate a locking pressure in the brake system of a multi-axle vehicle in a dynamic axle-load transfer, by:
determining, during a braking process, the locking pressure in a wheel brake device of a vehicle wheel at the vehicle wheel, at a first point in time during the axle-load transfer,
determining, at the first point in time, a wheel normal force at the vehicle wheel, and
ascertaining, at a second point in time subsequent to the first point in time, the locking pressure in the braking process, from the locking pressure determined at the first point in time, and from a relationship of a wheel normal force at the second point in time to the wheel normal force at the first point in time, and
provide the locking pressure ascertained at the second point in time as a locking pressure prediction to a brake pressure control system as an input variable.

12. A non-transitory computer-readable storage medium on which is stored a computer program including program code for improving a braking process, the program code, when executed by a computer, causing the computer to perform the following steps:
estimating a locking pressure in a brake system of a multi-axle vehicle in a dynamic axle-load transfer, by:
determining, during a braking process, the locking pressure in a wheel brake device of a vehicle wheel at the vehicle wheel, at a first point in time during the axle-load transfer, determining, at the first point in time, a wheel normal force at the vehicle wheel, and ascertaining, at a second point in time subsequent to the first point in time, the locking pressure in the braking process, from the locking pressure determined at the first point in time, and from a relationship of a wheel normal force at the second point in time to the wheel normal force at the first point in time, and providing the locking pressure ascertained at the second point in time as a locking pressure prediction to a brake pressure control system as an input variable.

\* \* \* \* \*